(12) United States Patent
Velivela (10) Patent No.: US 12,505,221 B2
(45) Date of Patent: Dec. 23, 2025

(54) SECURE AUTOMOTIVE SYSTEM

(71) Applicant: Continental Automotive Technologies GmbH, Hannover (DE)

(72) Inventor: Ramasubbarao Velivela, Bangalore (IN)

(73) Assignee: Continental Automotive Technologies GmbH, Hannover (DE)

( * ) Notice: Subject to any disclaimer, the term of this patent is extended or adjusted under 35 U.S.C. 154(b) by 57 days.

(21) Appl. No.: 18/086,779

(22) Filed: Dec. 22, 2022

(65) Prior Publication Data

US 2023/0205887 A1    Jun. 29, 2023

(30) Foreign Application Priority Data

Dec. 23, 2021    (GB) .................................... 2118872

(51) Int. Cl.
G06F 21/57      (2013.01)
G06F 21/45      (2013.01)
G06F 21/60      (2013.01)

(52) U.S. Cl.
CPC ............ *G06F 21/575* (2013.01); *G06F 21/45* (2013.01); *G06F 21/602* (2013.01); *G06F 2221/034* (2013.01)

(58) Field of Classification Search
CPC ...... G06F 21/575; G06F 21/45; G06F 21/602; G06F 2221/034
See application file for complete search history.

(56) References Cited

U.S. PATENT DOCUMENTS

| | | | |
|---|---|---|---|
| 2017/0257345 A1 | 9/2017 | Westra | |
| 2018/0189103 A1 | 7/2018 | Teshler | |
| 2018/0337957 A1 | 11/2018 | Chen | |
| 2019/0199524 A1* | 6/2019 | Takemori | G09C 1/00 |
| 2021/0288801 A1* | 9/2021 | Kulkarni | H04L 9/0631 |
| 2021/0344513 A1* | 11/2021 | Russell | H04W 4/40 |

(Continued)

FOREIGN PATENT DOCUMENTS

| | | |
|---|---|---|
| CN | 103905207 A | 7/2014 |
| CN | 106407814 A | 2/2017 |
| CN | 106603483 A | 4/2017 |

(Continued)

OTHER PUBLICATIONS

Search Report dated Sep. 7, 2022 from corresponding GB patent application No. 2118872.7.

(Continued)

*Primary Examiner* — Nelson S. Giddins (57) ABSTRACT

An Electronic Control Unit (ECU) provides security for an automotive system. The ECU is classified according to a Cybersecurity Assurance Level (CAL) and calculates a cryptographic value for one or more or all modules of the ECU. The calculated cryptographic value is compared with a stored cryptographic value. Based on the CAL classification of the ECU, either control to one or more modules of the ECU is provided or the ECU is shut down as follows: when the calculated cryptographic value matches the stored cryptographic value, control to the one or more or all modules of the ECU is provided; and, when the calculated cryptographic value does not match the stored cryptographic value, the ECU is shut down in one of a current boot cycle or a subsequent boot cycle.

19 Claims, 4 Drawing Sheets

(56) References Cited

U.S. PATENT DOCUMENTS

| | | |
|---|---|---|
| 2022/0329582 A1 | 10/2022 | Wang |
| 2023/0073884 A1* | 3/2023 | Farrell .................. G06F 21/54 |

FOREIGN PATENT DOCUMENTS

| | | | |
|---|---|---|---|
| CN | 109564606 A | 4/2019 | |
| EP | 2720405 A1 * | 4/2014 | ......... H04L 63/0823 |
| JP | 6976365 B2 | 12/2021 | |
| WO | 2021129511 A1 | 7/2021 | |

OTHER PUBLICATIONS

Search report dated Mar. 20, 2021.

Dr. Markus Tschersich / Cybersecurity in the Automotive Domain / Jan. 23, 2018.

Muhammad Sabir Idrees et al. "Secure Automotive On-Board Protocols: A case of Over-the-Air Firmware Updates", 2011, 15 pages, Springer-Verlag.

Andy Birnie et al."A Multi-Layer Vehicle Security Framework", May 2016, 18 pages, NXP B.V.

Sumeet Chhawri et al. "Smart Vehicles Automotive Cyber Security & Software Safety Applied To Leader-Follower (LF) And Autonomous Convoy Operations (ACO)", Vehicle Electronics And Architecture (VEA) Technical Session, Aug. 8-10, 2017, Novi, MI, Proceedings of the 2017 Ground Vehicle Systems Engineering and Technology Symposium (GVSETS), 2017, 7 pages.

Yamamoto et al. "ITU-T Technical paper: Standardization survey for over-the-air updating in vehicle", International Telecommunication Union Telecommunication Standardization Sector , SG16-C797, Study Group 16, Study Period 2017-2020, virtual meeting, Apr. 16, 2021, 64 pages.

Search Report dated Jul. 26, 2025 from corresponding Chinese patent application No. 202211657396.8.

First Notice of Examination Opinions dated Jul. 26, 2025 from corresponding Chinese patent application No. 202211657396.8.

* cited by examiner

SECURE AUTOMOTIVE SYSTEM

TECHNICAL FIELD

The present disclosure relates in general to automotive systems. Particularly, but not exclusively, the present disclosure relates to a method, apparatus, and system for securing automotive systems.

BACKGROUND

The automotive industry is rapidly growing, and legacy mechanical controls are now replaced with electronic controls powered by software codes. A modern day vehicle is connected to various systems for controlling, monitoring and analysis of vehicle parameters. Vehicular systems are controlled by a plurality of controllers, commonly known as Electronic Control Units (ECUs). A modern day vehicle comprises different types of ECUs such as Body Control Unit (BCU), Vehicle Control Unit (VCU), and the like. Each ECU has dedicated functions. Often, an ECU communicates with other ECUs to operate the vehicle. An ECU hosts one or more software applications and firmware.

As modern vehicles are connected to the Internet and communicat with outside infrastructures and other vehicles, the vehicle ECU is vulnerable to cyber-attacks. A common way to attack the vehicle ECU is by way of malicious applications or via firmware update. Hence, there is a need to detect the cyber-attacks and take effective actions upon detecting the cyber-attacks.

The information disclosed in this background of the disclosure section is only for enhancement of understanding of the general background of the invention and should not be taken as an acknowledgment or any form of suggestion that this information forms the prior art already known to a person skilled in the art.

BRIEF SUMMARY

Additional features and advantages are realized through the techniques of the present disclosure. Other embodiments and aspects of the disclosure are described in detail herein and are considered a part of the claimed disclosure.

In an embodiment, the present disclosure discloses a method, an Electronic Control Unit (ECU), and a secure automotive system. The method includes calculating a cryptographic value for one or more or all modules of the ECU. The ECU is classified according to a Cybersecurity Assurance Level (CAL). Further, comparing the cryptographic value with a stored cryptographic value. Thereafter, based on the CAL classification of the ECU, performing one of: providing control to the one or more or all modules of the ECU when the cryptographic value matches the stored cryptographic value; and shutting down the ECU in one of, a current boot cycle or a subsequent boot cycle when the cryptographic value does not match the stored cryptographic value.

In an embodiment, the cryptographic value is a Message Authentication Code (MAC).

In an embodiment, the cryptographic value is calculated for the one or more or all modules based at least on a length of a code of the one or more or all modules and a start address and an end address of the code of the one or more or all modules.

In an embodiment, the one or more or all modules comprise at least one of, a boot manager, a boot loader, and an application.

In an embodiment, shutting down the ECU comprises: determining the CAL of the ECU; shutting down the ECU in a current boot cycle when the ECU is classified as CAL 4 and/or CAL 3; and shutting down the ECU in a subsequent boot cycle when the ECU is classified as CAL 2 and/or CAL 1.

In an embodiment, shutting down the ECU in the subsequent boot cycle comprises: providing control to the one or more or all modules of the ECU in the current boot cycle after determining that the cryptographic value does not match the stored cryptographic value.

In an embodiment, shutting down the ECU further comprises: logging failure of the ECU in a memory.

In an embodiment, the method comprising securing access to the ECU using Public Key Infrastructure (PKI).

In an embodiment, securing access to the ECU comprises: storing a root certificate including a root public key in the ECU; upon receiving a request from a device for accessing the ECU, generating and transmitting a challenge to the device; receiving a response to the challenge, the response comprising a device signature and a device certificate, wherein the device signature is generated by signing a cryptographic value of the challenge using a device private key, and wherein the device certificate is generated using a root private key; authenticating the device by verifying the device certificate using the root public key; and verifying the signature using the public key obtained from the device certificate, wherein the device is allowed to access the one or more ECUs after successful verification The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof are shown by way of example in the drawings and may be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "includes" "comprising", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus preceded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
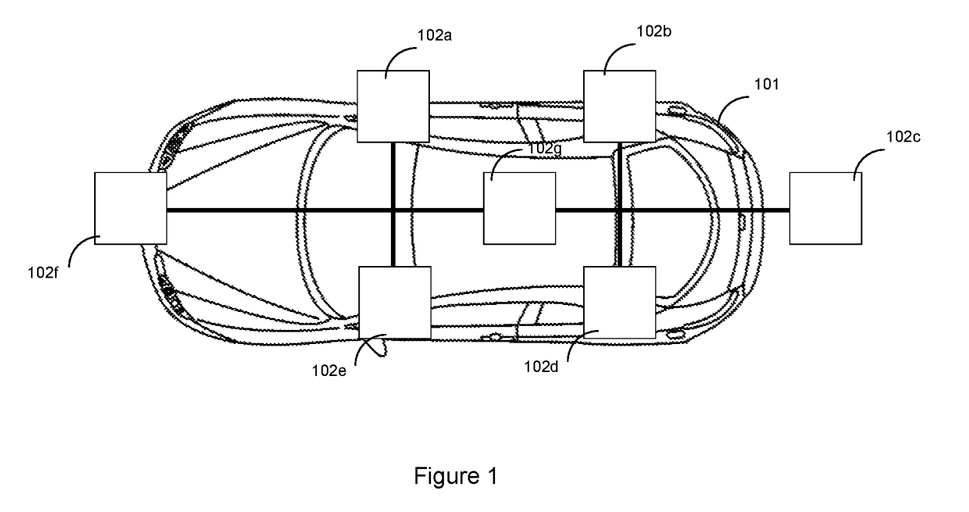
FIG. 1 shows a simplified diagram of vehicular network, in accordance with some embodiments of the present disclosure.

FIG. 1 shows an architecture of a vehicle network. A vehicle 101 includes a plurality of Electronic Control Units (ECUs) 102a, 103b, . . . , 102g. Each ECU is configured to perform one or more functions. For example, the ECU 102a may be configured to control Anti-lock Braking System (ABS) of the vehicle 101 and the ECU 102b may be configured to control an infotainment system of the vehicle 101. Further, each ECU is classified according to Cybersecurity Assurance Level (CAL). In an embodiment, the CAL is defined as per ISO/SAE 31434. An ECU classified as a CAL-4 has a highest cybersecurity assurance. For example, the ECU 102a may be configured to control the Advance Driver Assistance Systems (ADAS) functions. The ADAS functions are safety critical and the ECU 102a performing the ADAS functions is classified under a highest safety level. Hence, the ECU 102 performing the ADAS functions are required to be secured with highest assurance and are classified under CAL-4. Likewise, the ECU 102 configured to perform functions such as ABS and airbag deployment may be classified as CAL-4. Further, the ECU 102 configured to perform functions such as engine management and suspension may be classified as CAL-3. Likewise, the ECU 102 configured to perform functions such as light control, operate an instrument cluster, an infotainment system, or cruise control, may be classified as CAL-2 and or CAL-1. In one embodiment, the ECU 102 may be classified under two CAL categories.

In an embodiment, the plurality of ECUs 102a, 103b, . . . , 102g may communicate with each other via communication lines such as Controller Area Network (CAN), CAN FD, FlexRay, Local Interconnect (LIN) and the like. In an embodiment, the vehicle network is built in an Electrical/Electronic (E/E) architecture. The ECU 102 can be attacked by tampering the flash files and sending the tampered flash file for ECU update. When the ECU 102 executes the tampered flash file, the ECU 102 is disabled or controlled by the attacker. Hence, the ECU 102 needs to detect a cyberattack.

Figure 2:
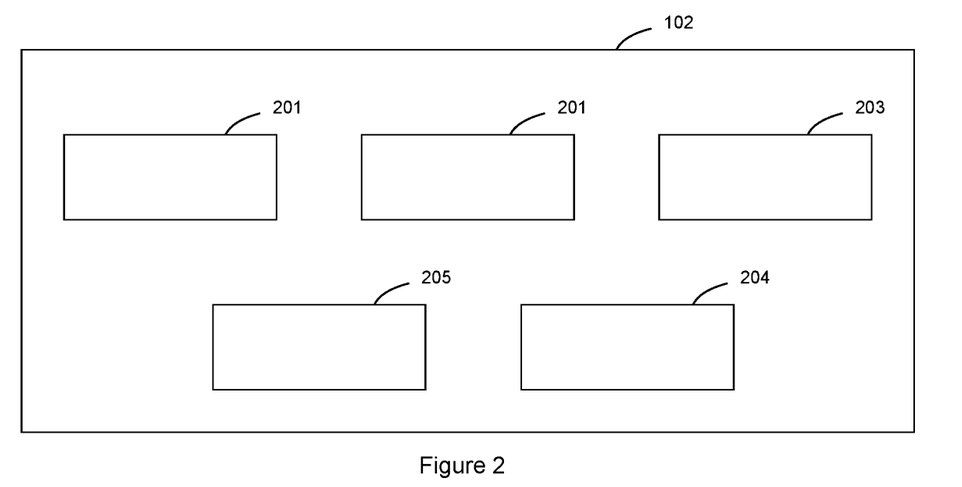
FIG. 2 shows a simplified diagram of an ECU, in accordance with some embodiments of the present disclosure.

FIG. 2 shows a simplified diagram of the ECU 102 of the automotive system, in accordance with some embodiments of the present disclosure. The ECU 102 comprises a Hardware Security Module (HSM) 201, a boot manager 202, a bootloader 203, one or more applications 204, and an interface 205. The boot manager 202 is a boot application stored in a Read Only Memory (ROM) of the ECU 102. The boot manager 202 is configured to boot a firmware, also stored in the ROM during every boot sequence of the ECU 102. The boot manger 202 is further configured to check for firmware updates and initializes firmware download if the firmware update is available. Further, the boot manager 202 is configured to provide control to the bootloader 203 to execute the firmware.

The bootloader 203 is configured to boot the firmware selected by boot manager 202. The bootloader executes the firmware present in the ROM. Once the firmware is executed, the bootloader 203 then executes one or more applications 204 present in the ECU 102.

The one or more applications 204 may include an airbag deployment application, an ADAS application, a light-control application, an infotainment-control application, and the like.

The interface 205 may include a CAN interface, a CAN FD interface, a LIN interface, a FLexRay interface, and the like. The interface 205 enables the ECU 102 to connect to the in-vehicle network. The in-vehicle network is accessed by the plurality of ECUs 102a, 102b, . . . , 102g. Data is exchanged between the plurality of ECUs 102a, 102b, . . . , 102g and/or between the ECU 102 and one or more sensors or actuators of the vehicle 101.

The HSM 201 may be a hardware or a software component present in the ECU 102 that provides security against cyber-attacks. The HSM 201 is configured to generate and store cryptographic keys, certificates, provide secure hash functions. The HSM 201 supports secure flash programming, and re-programming.

In an embodiment, the ECU 102 includes one or more processors or controller (not shown) and a memory (RAM, ROM). The ECU 102 may also include storage memory.

Figure 3:
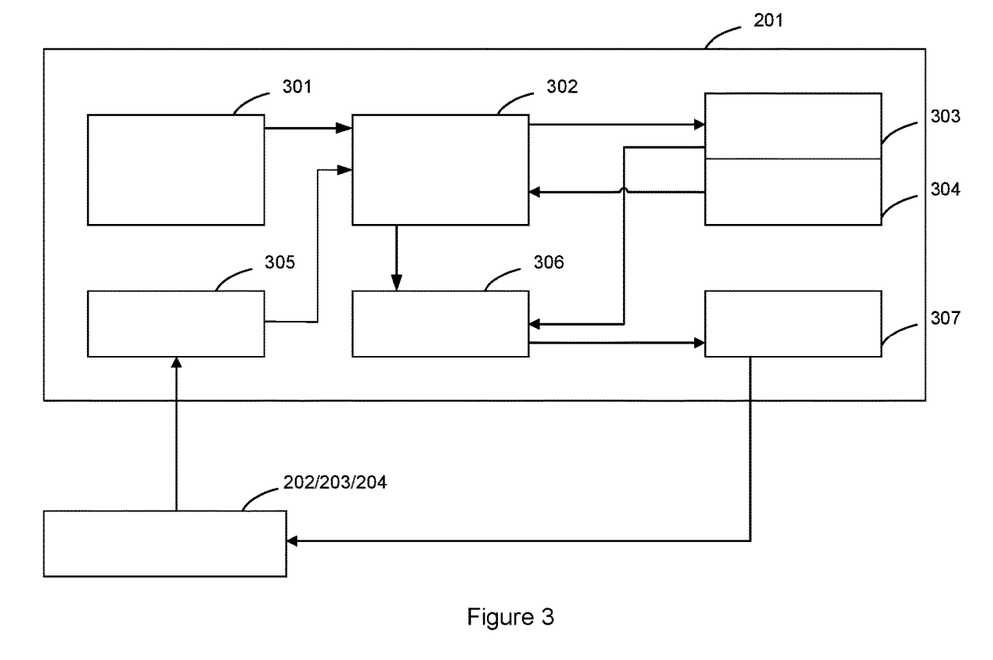
FIG. 3 shows an exemplary architecture of internal elements HSM, in accordance with some embodiments of the present disclosure.

FIG. 3 shows a simplified block diagram of the HSM 201. The HSM 201 includes a Random Number Generator (RNG) 301, a crypto generator 302, a boot Message Authentication Code (MAC) 303, a root public key 304, a bus interface 305, a comparator 306, and a host interface 307. The host interface 307 is configured with memory mapped registers that are used by the one or more processors or controllers of the ECU 102 to issue commands. The bus interface 305 allows the HSM 201 to access memory of the ECU 102. The HSM 201 may include secure memory for storing the cryptographic keys and cryptographic values. For example, the HSM 201 may comprise 20 memory slots with one ROM slot and 15 non-volatile slots and one RAM slot. The secure memory stores the boot MAC value, the root public key, and, optionally, a master key. The boot MAC value may be specific to the module for which the HSM is designed. For example, each module 202, 203, 204, 205 has its own HSM 201, or a single HSM 201 may be operated with each module 202, 203, 204, 205. In an embodiment, different types of MAC can be generated. For example, HMAC, CMAC, KMAC.

In an embodiment, a plurality of flags may be provided. Each flag is associated with dedicated indications and actions. For example, a secure boot flag is set when MAC value of firmware does not match the stored MAC value (explained in detail further). Further, a key flag is set when the key is used for generating the MAC value, and the key is reset when the key is used for verification. The HSM 201 may be configured to support AES encryption and decryption standards. The HSM 201 may use AES-128 MAC algorithm for message authentication. The key for the MAC operation is selected from the memory slots. The MAC algorithm uses a secret key and an arbitrary length message to be authenticated, and outputs a MAC value as the cryptographic value. The MAC value protects integrity and authenticity. The secret key may be generated using the RNG 301. For example, the RNG 301 may generate a 128-bit key which is used for generating the MAC. The arbitrary length value may be the start address and the end address values of the one or more modules 202, 203, 204, 205. For example, consider an application 204 that has to be secured. The application 204 when stored in the ECU 102 has a start address value and an end address value. The crypto generator 302 may execute the MAC algorithm by taking the start address and end address values of the application 204, and the secret key generated by the RNG 301 and generate a unique MAC value for the application 204. The MAC value generated for the application 204 is stored in the dedicated memory slots. Further, when the ECU 102 is powered up and when the application 204 is initialized for execution, the HSM 201 determines the authenticity and integrity of the application 204. The HSM 201 obtains the start address and the end address values of the application 204 via the bus interface 305. Further, the start address and the end address values are provided to the crypto generator 302, which generates the MAC value. The calculated MAC value is then compared with the stored MAC value in the comparator 306. When the calculated MAC value matches the stored MAC value, it is determined that the application 204 is authentic and is allowed to be executed. When the calculated MAC value does not match the stored MAC value, an appropriate action is performed. Likewise, the HSM 201 is also configured to the boot manager 202 and the bootloader 203. The MAC value is generated and stored for the boot manager 202. During every boot, a new MAC value is calculated for the boot manager 202. When there is a match, control is provided to the boot manager 202, where the boot manager 202 executes its functions. Further, when the boot manager 202 selects a firmware and initializes the bootloader 203, the MAC value is calculated for the bootloader 203 and is compared with the stored MAC value. When there is a match, the control is provided to the bootloader 203 to run the firmware, and when there is no match, the appropriate action is performed. In an embodiment, the appropriate action comprises shutting down the ECU 102 in one of a current boot cycle or a subsequent boot cycle based on the CAL classification of the ECU 102.

In an embodiment, the host interface 307 may set a bit for successful authentication and reset the bit for unsuccessful authentication. In another embodiment, the bit value of the host interface 307 may be reversed to indicate successful and unsuccessful authentication. Further, the bit value is provided to the one or more modules 202, 203, 204. The bit value may also be provided to a power controller of the ECU 102 for shutting down the ECU 102 based on the bit value of the host interface 307.

In an embodiment, when the calculated CAMV value does not match the stored MAC value, the ECU 102 is shut down based on certain conditions. The HSM 201 determines the CAL classification of the ECU 102. When the ECU 102 is classified as CAL-4 and/or CAL-3, the ECU 102 may be shut down in the current boot cycle. As explained before, CAL-4 and CAL-3 classified ECU performs safety critical functions, and a mismatch between the calculated MAC value and the stored MAC value indicates that the safety critical ECU is compromised. Hence, such ECUs are shut down in the current boot cycle to prevent further damage to the vehicle 101 and occupants. In an embodiment, when the ECU 102 is classified as CAL-2 and/or CAL-1, the ECU 102 may be shut-down in a subsequent boot cycle. As the CAL-2 and CAL-1 are not related to safety critical functions, the ECUs, which are classified under these CAL classes, can be shut down in a subsequent boot cycle. However, the present disclosure does not limit to the shutting down the ECU 102 classified as CAL-2 and/or CAL-1 in the subsequent boot cycle, and the ECU 102 can be shut down in the current boot cycle as well.

In an embodiment, when the HSM 201 is configured to shut down the ECU 102 in the subsequent boot cycle, the one or more or all the modules 202, 203, 204 are provided control to perform respective functions in the current boot cycle. For example, when it is determined that a light control application has been attacked, the ECU 102 comprising the light control application is configured to be shut down in the subsequent boot cycle. However, the light control application may be provided control to operate the light of the vehicle 101 in the current boot cycle. As the functions of the CAL-2 and CAL-1 ECUs are not safety critical, the ECUs can be operated although such ECUs are attacked, as they may not pose a threat. Further, when an intrusion is detected, a failure is logged in the memory of the HSM 201. Details related to the failure such as, date, time, module name, ECU ID, CAL type, and the like may also be included in the log. Further, the failure log may also be communicated to a remote center for analysis. The remote center may analyze the failure log and develop a patch/firmware update. The firmware update may be released to a vehicle fleet.

In an embodiment, the ECU 102 may communicate with the remote center via communication channels such as 5G/LTE and the like. However, communicating via such channels also poses a threat to the ECU 102. Hence, the present disclosure proposes a secure access to the ECU 102 using a Public Key Infrastructure (PKI) technique. The PKI technique uses key pairs that are used to authenticate the entity communicating with the ECU 102. The working of the PKI technique is explained in detail below.

Figure 4:
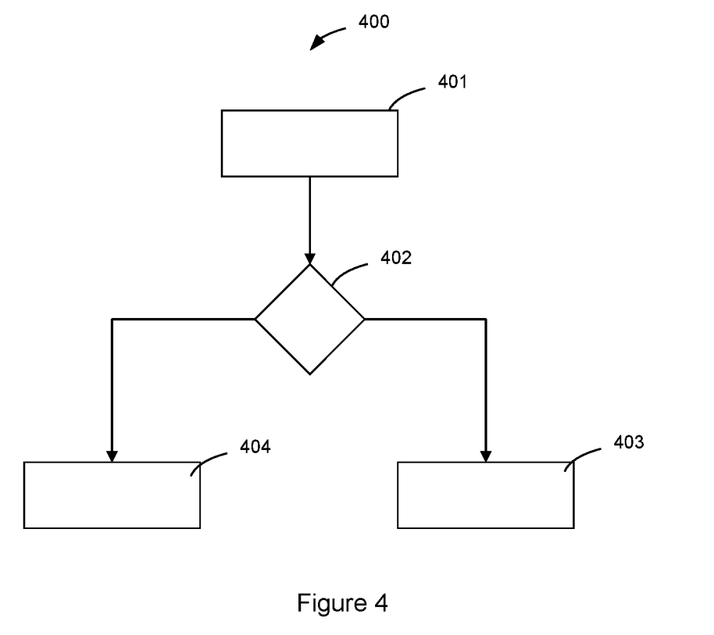
FIG. 4 shows an exemplary flowchart illustrating method steps for securing an automotive system, in accordance with some embodiments of the present disclosure.

FIG. 4 shows a flowchart illustrating a method for securing the automotive system, in accordance with some embodiment of the present disclosure. The order in which the method 400 may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combinations thereof.

At the step 401, calculating the cryptographic value for the one or more or all modules 202, 203, 204 of the ECU 102. In an embodiment, the calculation of the cryptographic value or the MAC value is performed every boot cycle. The MAC value can also be calculated at a defined time period, when the ECU 102 is not rebooted for a long time period. For example, when an infotainment application is run for ten hours, and when the ECU 102 hosting the infotainment application is not rebooted for ten hours, the MAC value can be calculated for verification after ten hours. As described above, the ECU 102 is classified according to the CAL.

At step 402, comparing the MAC value with the stored MAC value. The stored MAC value may be generated during manufacture or by an Original Equipment Manufacturer (OEM). For example, when the ECU 102 is manufactured, MAC value for the boot manager 202, the bootloader 203, and one or more stock applications 204 may be generated and stored in respective or common HSM 201. In an embodiment, MAC value for third-party applications may also be generated when such applications are deployed in the ECU. In an embodiment, the MAC value is generated using start address values and end address values of the one or more modules 202, 203, 204. However, the MAC value generation is not limited to using start and end address values, and other information related to the one or more modules 202, 203, 204 may also be considered. Further, during every boot cycle or after a defined time period, a new MAC value is calculated for the one or more modules 202, 203, 204, and the new MAC value is compared with the stored MAC value. A successful match in the comparison indicates that the ECU 102 is not intruded with malicious codes. An unsuccessful match indicates that the ECU 102 has been intruded.

Step 403 is performed when the comparison at step 402 is successful. At step 403, the one or more modules 202, 203, 204 are provided control to perform respective functions. For example, when MAC value of boot manager 202 matches the stored MAC value of the boot manger 202, the boot manger 202 is provided control to initialize boot sequence of the ECU 102. Likewise, when MAC value of bootloader 203 matches the stored MAC value of the bootloader 203, the bootloader 203 is provided control to load the firmware of the ECU 102.

Figure 5:
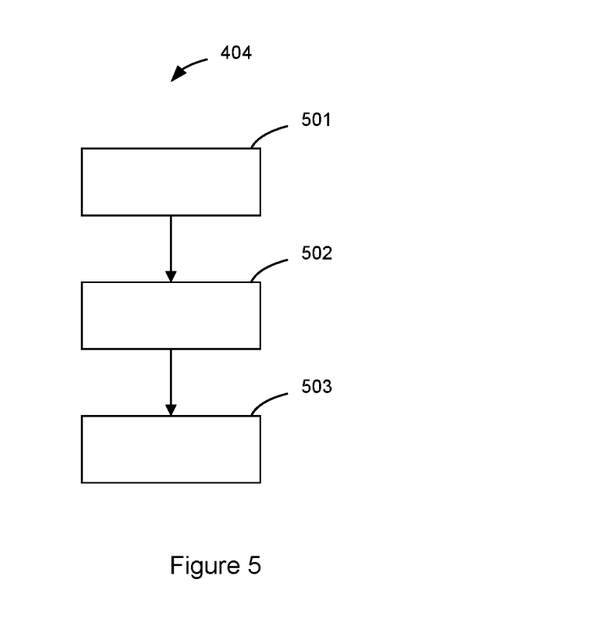
FIG. 5 shows an exemplary flowchart illustrating method steps for conditionally shutting down the ECU, in accordance with embodiments of the present disclosure.

Step 404 is performed when the comparison at step 402 is unsuccessful. At step 404, the ECU 102 is shut down in either of a current boot cycle or a subsequent boot cycle based on the CAL classification of the ECU 102. Reference is now made to FIG. 5 which illustrates the shutdown procedure of the ECU 102. At step 501, determining CAL classification of the ECU 102. The ECU 102 may be classified under one or two CAL categories. For example, the ECU 102 may be classified as CAL-4 and CAL-3. The ECU 102 may have functions that are very high safety critical and medium safety critical. Hence, the ECU 102 may be classified under two CAL categories. At step 502, shutting down the ECU 102 in the current boot cycle when the ECU 102 is classified as CAL-4 and/or CAL-3. As the ECU 102 classified under CAL-4 and/or CAL-3 performs safety critical functions, the ECU 102 is shut down immediately (current boot cycle). At step 503, the ECU 102 is shut down in the subsequent boot cycle when the ECU 102 is classified as CAL-2 and/or CAL-1.

In an embodiment, when the ECU 102 is shut down in the subsequent boot cycle, the one or more or all modules 202, 203, 204 are provided control to perform respective functions in the current boot cycle. Further, the failure of the ECU 102 is logged in the memory of the HSM 201, and such failure data is transmitted to the remote center for analysis. The remote center may analyze and release a patch or firmware/software update to the ECU 102, and the update is transmitted back to the ECU 102 via the communication channels. To secure the access to ECU 102 by external agents such as the remote center, the PKI technique is employed.

Figure 6:
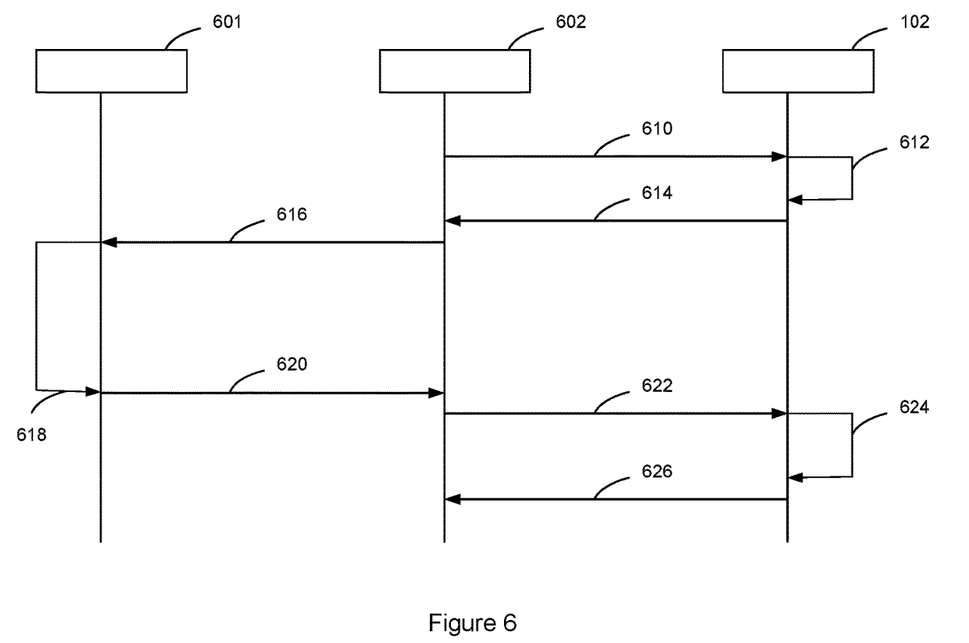
FIG. 6 illustrates a secure message flow between an ECU and external systems, in accordance with some embodiments of the present disclosure.

FIG. 6 illustrates an exemplary PKI technique to secure access to the ECU 102. In an embodiment, FIG. 6 specifically illustrates a challenge-response method. The challenge response method is based on the PKI architecture. The PKI architecture includes a trusted entity or certificate entity 601, an outside entity or the remote center 602, and the device to be protected or ECU 102. The remote center 602 may be a developer or testing facility associated with the OEM. The trusted entity or the certificate entity 601 may be a facility that issue certificates (TSL or SSL certificates). The trusted entity 601 may generate a root certificate using its private key and include a root public key in the certificate. The certificate including the root public key is stored in the ECU 102 (preferably in the HSM 201). Further, the certificate also mentions the sources that the trusted entity 601 has verified as authentic. When the remote center 602 has to establish communication with the ECU 102, the integrity and the authenticity of the remote center 602 has to be verified. This is possible using the challenge-response technique. The remote center 602 sends a request message 610 to the ECU 102 requesting the challenge. The ECU 102 generates 612 the challenge. In an embodiment, the challenge may be a random number generated using the RNG 301. Further, the ECU 102 transmits 614 the challenge to the remote center 602. The remote center 602 then forwards 616 the received challenge to the trusted entity 601. The trusted entity 601 authenticates the remote center 602 and generates 618 a response to the challenge. The response to the challenge includes a hash value of the challenge and a certificate. The hash value of the challenge is signed using a private key of the remote center 602, and a corresponding public key is enclosed in the certificate. In one embodiment, the key pair (private key and public key of the remote center 602) is generated by the trusted entity 601. Further, the response is transmitted 620 to the remote center 602, which in turn forwards 622 the response to the ECU 102. The ECU 102 verifies 624 the authenticity of the response using the root public key stored in the HSM 201. When the authenticity is verified, the integrity is verified by decrypting the sign using the public key of the remote center 602. When both the authenticity and the integrity is verified, the remote center is given access to communicate with the ECU 102. Therefore, the access to the ECU 102 is always secure.

Figure 7:
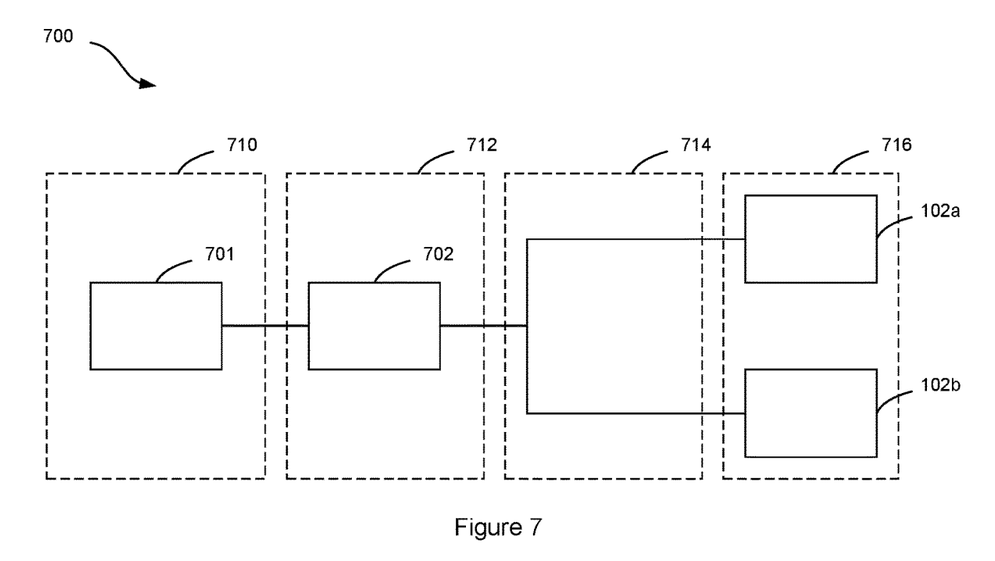
FIG. 7 is an illustration of an automotive system, in accordance with some embodiments of the present disclosure.

FIG. 7 illustrates an exemplary automotive system 700. The automotive system 700 includes the plurality of ECUs 102a, 102b, a gateway device 702, and a Communication Control Unit (CCU) 701. In an embodiment, the plurality of ECUs 102a, 102b communicate with each other via secure in-vehicle communication network. The vehicle communication network can be secured by implementing the MAC value for Protocol Data Units (PDUs) transmitted by each ECU. Also, a freshness value truncated to the MAC value ensures secure communication between ECUs and that intrusion in the vehicle communication network can be detected. Further, the gateway device 702 secures the ECU network of the vehicle by implementing rules and separating domains. Furthermore, the communication of the vehicle 102 with outside entities such as other vehicles and remote centers are secured as the communication is routed via the CCU 701 and using the challenge-response method. Further, firmware updates also can be verified for integrity using the MAC values for flash drivers. Hence, the vehicle architecture is divided into four levels 710, 712, 714, 716, which ensure a secure automotive system 700.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an", and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 and FIG. 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

The invention claimed is:

1. A computer implemented method of securing an automotive system, the method comprising:
    calculating a cryptographic value for one or more or all modules of an Electronic Control Unit (ECU) of an automotive system, wherein the ECU is classified according to Cybersecurity Assurance Level (CAL);
    comparing the calculated cryptographic value with a stored cryptographic value; and
    based on the CAL classification, performing one of:
        providing control to the one or more or all modules when the calculated cryptographic value matches the stored cryptographic value; or
        shutting down the ECU in one of a current boot cycle or a subsequent boot cycle when the calculated cryptographic value does not match the stored cryptographic value;
    wherein the cryptographic value is calculated for the one or more or all modules based at least on a length of a code of the one or more or all modules and a start address and an end address of the code of the one or more or all modules.

2. The method of claim 1, wherein the calculated cryptographic value is a Message Authentication Code (MAC).

3. The method of claim 1, wherein the one or more or all modules comprise at least one of: a boot manager, a boot loader, and an application.

4. The method of claim 1, wherein shutting down the ECU comprises:
    determining the CAL of the ECU;
    shutting down the ECU in a current boot cycle when the ECU is classified as CAL-4 and/or CAL-3; and
    shutting down the ECU in a subsequent boot cycle when the ECU is classified as CAL-2 and/or CAL-1.

5. The method of claim 1, wherein shutting down the ECU in the subsequent boot cycle comprises:
    providing control to the one or more or all modules of the ECU in the current boot cycle after determining that the calculated cryptographic value does not match the stored cryptographic value.

6. The method of claim 1, wherein shutting down the ECU further comprises:
    logging failure of the ECU in a memory.

7. The method of claim 1, further comprising securing access to the ECU using Public Key Infrastructure (PKI).

8. The method of claim 1, wherein securing access to the ECU comprises:
    storing a root certificate including a root public key in the ECU;
    upon receiving a request from a device for accessing the ECU,
        generating and transmitting a challenge to the device;
        receiving a response to the challenge, the response comprising a device signature and a device certificate, wherein the device signature is generated by signing a cryptographic value of the challenge using a device private key, and wherein the device certificate is generated using a root private key;
authenticating the device by verifying the device certificate using the root public key; and
verifying the signature using the public key obtained from the device certificate, wherein the device is allowed to access the ECU after successful verification.

9. An Electronic Control Unit (ECU) comprising:
a Hardware Security Module (HSM);
a boot manager;
a boot loader; and
one or more applications;
wherein the HSM (201) is configured to:
calculate a cryptographic value for one or more or all modules of the ECU,
wherein the ECU is classified according to Cybersecurity Assurance Level (CAL);
compare the calculated cryptographic value with a stored cryptographic value; and
based on the CAL classification, perform one of:
provide control to the one or more or all modules when the calculated cryptographic value matches the stored cryptographic value; or
shut down the ECU in one of a current boot cycle or a subsequent boot cycle when the calculated cryptographic value does not match the stored cryptographic value based on the CAL classification;
wherein the HSM is configured to calculate the cryptographic value for the one or more or all modules based at least on a length of a code of the one or more or all modules and a start address and an end address of the code of the one or more or all modules.

10. The ECU of claim 9, wherein the HSM is configured to calculate a Message Authentication Code (MAC) as a cryptographic value.

11. The ECU of claim 9, wherein the HSM is configured to shut down the ECU, wherein the HSM is configured to:
determine the CAL of the ECU;
shut down the ECU in a current boot cycle when the ECU is classified as CAL-4 and/or CAL-3; and
shut down the ECU in a subsequent boot cycle when the ECU is classified as CAL-2 and/or CAL-1.

12. The ECU of claim 9, wherein the HSM is configured to shut down the ECU in the subsequent boot cycle, wherein the HSM is further configured to:
provide control to the one or more or all modules of the ECU in the current boot cycle after determining that the calculated cryptographic value does not match the stored cryptographic value.

13. The ECU of claim 9, wherein the HSM is configured to shut down the ECU, wherein the HSM is further configured to:
log failure of the ECU in a memory.

14. The ECU of claim 9, wherein the HSM is further configured to secure access to the ECU using Public Key Infrastructure (PKI).

15. The ECU of claim 9, wherein the HSM is configured to secure access to the ECU, wherein the HSM is configured to:
store a root certificate including a root public key in the ECU;
upon receiving a request from a device for accessing the ECU,
generate and transmit a challenge to the device;
receive a response to the challenge, the response comprising a device signature and a device certificate, wherein the device signature is generated by signing a cryptographic value of the challenge using a device private key, and wherein the device certificate is generated using a root private key;
authenticate the device by verifying the device certificate using the root public key; and
verify the signature using the public key obtained from the device certificate, wherein the device is allowed to access the ECU after successful verification.

16. An automotive system comprising:
a plurality of Electronic Control Units (ECUs), wherein at least one ECU comprises:
a Hardware Security Module (HSM);
a boot manager;
a boot loader; and
one or more applications;
wherein the HSM (201) is configured to:
calculate a cryptographic value for one or more or all modules of the ECU, wherein the ECU is classified according to Cybersecurity Assurance Level (CAL);
compare the calculated cryptographic value with a stored cryptographic value;
based on the CAL classification, perform one of:
provide control to the one or more or all modules when the calculated cryptographic value matches the stored cryptographic value; or
shut down the ECU in one of a current boot cycle or a subsequent boot cycle when the calculated cryptographic value does not match the stored cryptographic value based on the CAL classification; and
calculate the cryptographic value for the one or more or all modules based at least on a length of a code of the one or more or all modules and a start address and an end address of the code of the one or more or all modules
a gateway; and
a Communication Control Unit (CCU).

17. The automotive system of claim 16, wherein the HSM is configured to shut down the at least one ECU, wherein the HSM is configured to:
determine the CAL of the at least one ECU;
shut down the at least one ECU in a current boot cycle when the at least one ECU is classified as CAL-4 and/or CAL-3; and
shut down the at least one ECU in a subsequent boot cycle when the at least one ECU is classified as CAL-2 and/or CAL-1.

18. The automotive system of claim 16, wherein the HSM is configured to shut down the at least one ECU, wherein the HSM is further configured to:
log failure of the at least one ECU in a memory.

19. The automotive system of claim 16, wherein the HSM is configured to secure access to the at least one ECU, wherein the HSM is configured to:
store a root certificate including a root public key in the at least one ECU;
upon receiving a request from a device for accessing the at least one ECU,
generate and transmit a challenge to the device;
receive a response to the challenge, the response comprising a device signature and a device certificate, wherein the device signature is generated by signing a cryptographic value of the challenge using a device private key, and wherein the device certificate is generated using a root private key;

authenticate the device by verifying the device certificate using the root public key; and verify the signature using the public key obtained from the device certificate, wherein the device is allowed to access the at least one ECU after successful verification.

\* \* \* \* \*